(12) United States Patent
Nakamura

(10) Patent No.: US 7,800,663 B2
(45) Date of Patent: Sep. 21, 2010

(54) IMAGE PICKUP DEVICE AND IMAGE PICKUP METHOD

(75) Inventor: Kazuhiko Nakamura, Wako (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 429 days.

(21) Appl. No.: 11/844,444

(22) Filed: Aug. 24, 2007

(65) Prior Publication Data

US 2008/0074526 A1    Mar. 27, 2008

(30) Foreign Application Priority Data

Sep. 25, 2006    (JP) ............................. 2006-259459

(51) Int. Cl.
*H04N 9/64* (2006.01)

(52) U.S. Cl. ...................................... 348/248; 348/243

(58) Field of Classification Search ................. 348/248, 348/249, 241
See application file for complete search history.

(56) References Cited

U.S. PATENT DOCUMENTS

2006/0044424 A1*    3/2006    Shirai et al. ................. 348/241

FOREIGN PATENT DOCUMENTS

JP         7-67038         3/1995

* cited by examiner

*Primary Examiner*—Tuan Ho
(74) *Attorney, Agent, or Firm*—Brundidge & Stanger, P.C.

(57) ABSTRACT

In a solid-state image pickup device using a CCD solid-state image pickup device, a vertical smear is reduced so as not to be influenced by a dark current such as a white blemish of the CCD solid-state image pickup device. A dark current variation in the vertical direction of a display screen of signals which are read out before effective pixels of a photosensitive surface of the solid-state image pickup device and obtained from a vertical light-shielded image is corrected. A vertical smear correction signal is calculated from each vertical pixel signal of the vertical light-shielded image and subtracted from image signals which are outputted from the effective pixels of the photosensitive surface. A represent-value signal is calculated from the signals outputted from the solid-state image pickup device and subtracted from the image signals outputted from the effective pixels of the photosensitive surface.

12 Claims, 18 Drawing Sheets

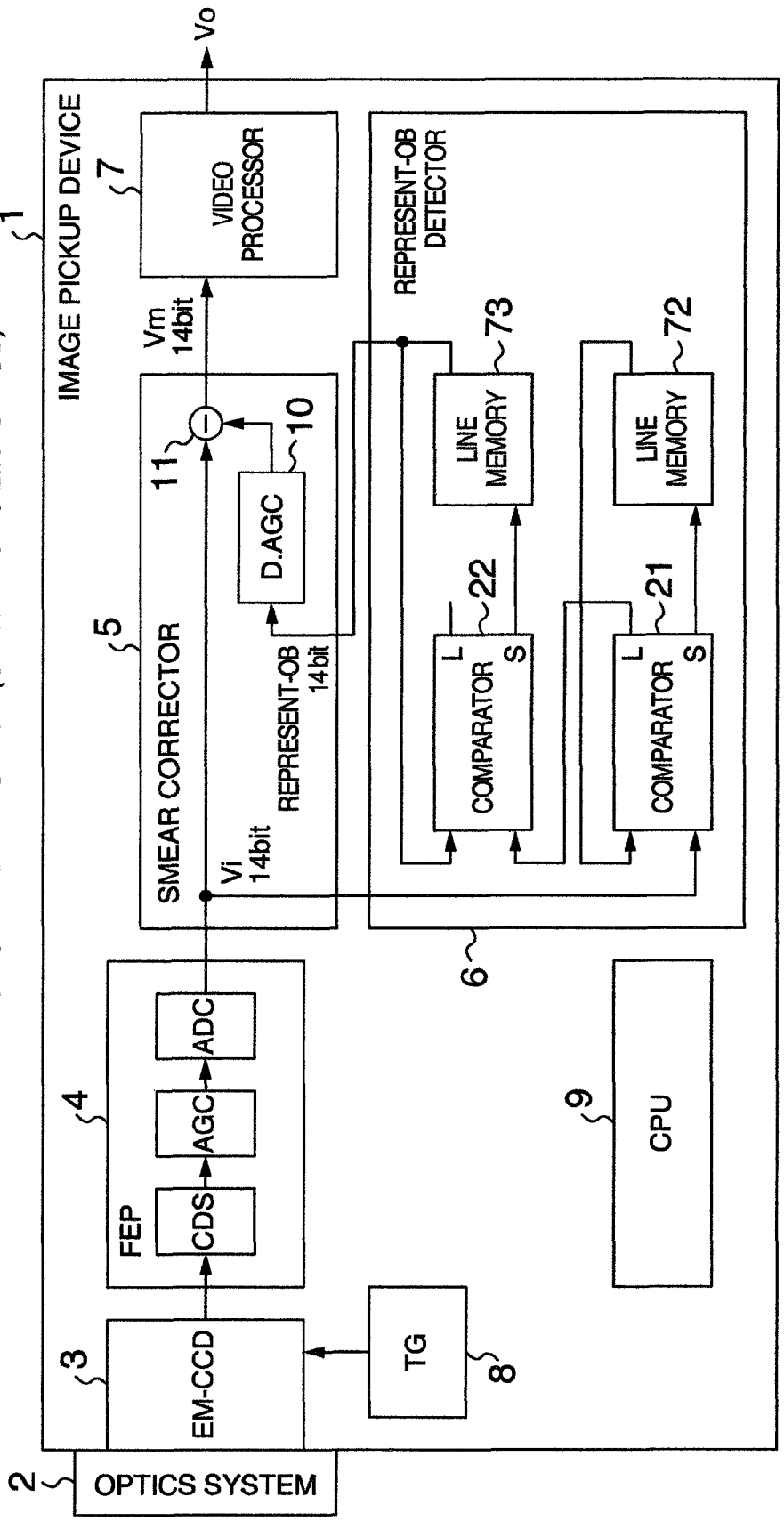

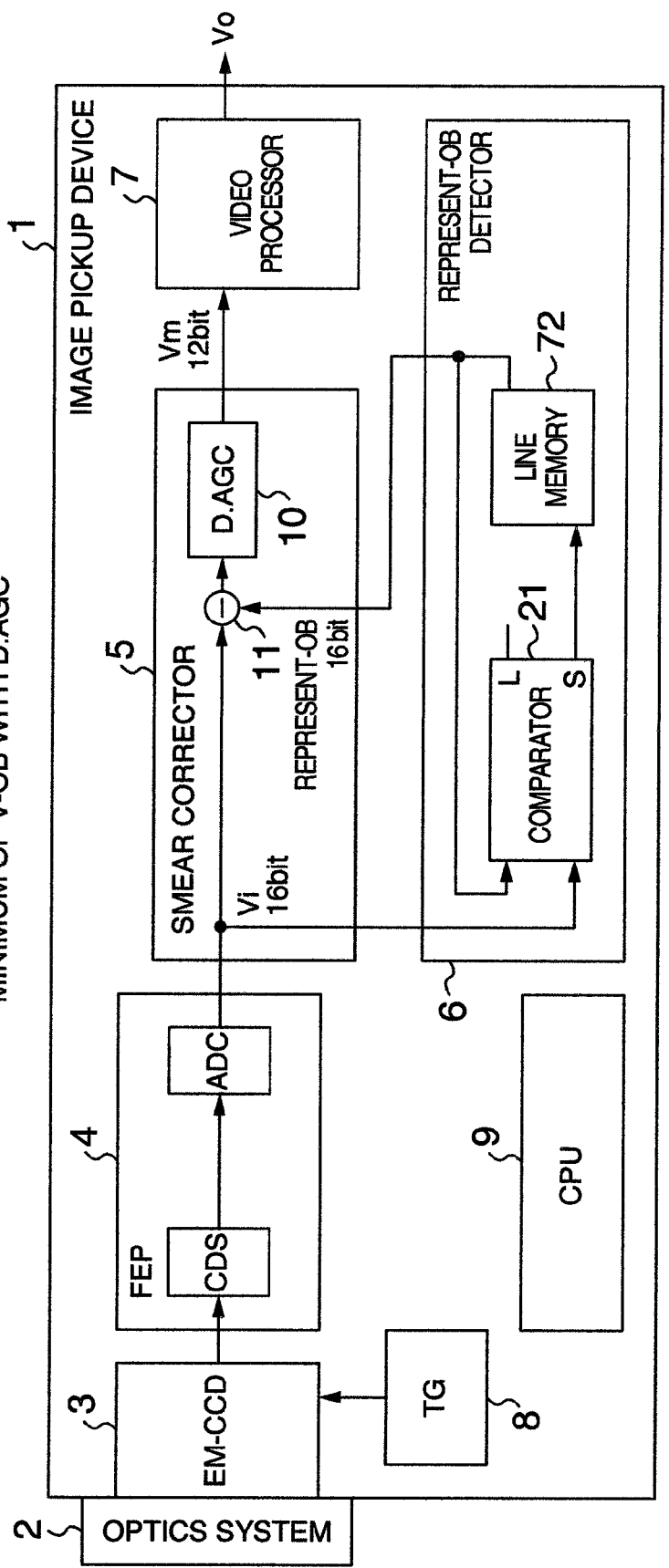

MEAN WITHOUT MAXIMUM OF OVER 3-LINES V-OB

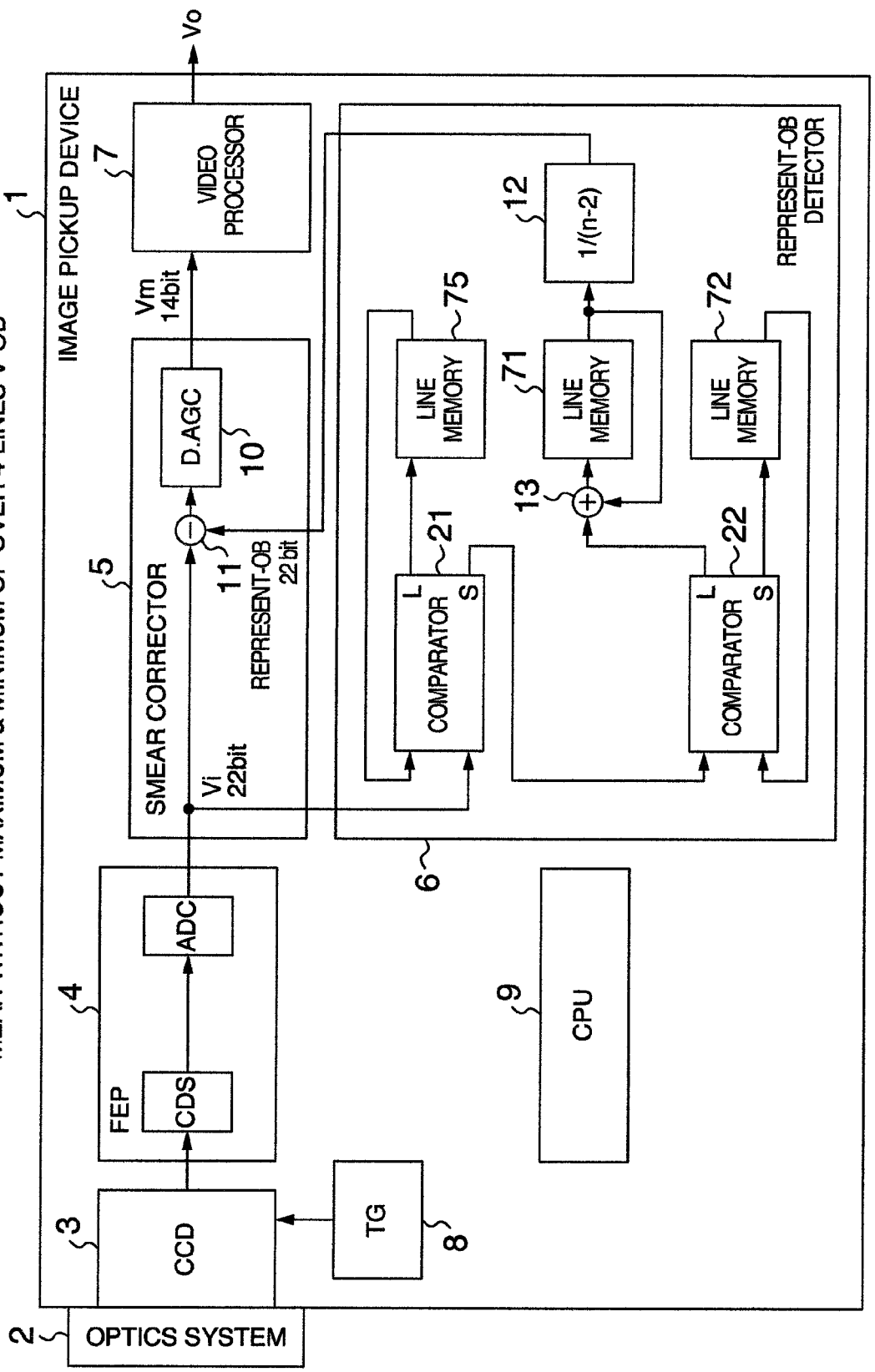

MEAN WITHOUT MAXIMUM & 2ND MAXIMUM OF OVER 4-LINES V-OB

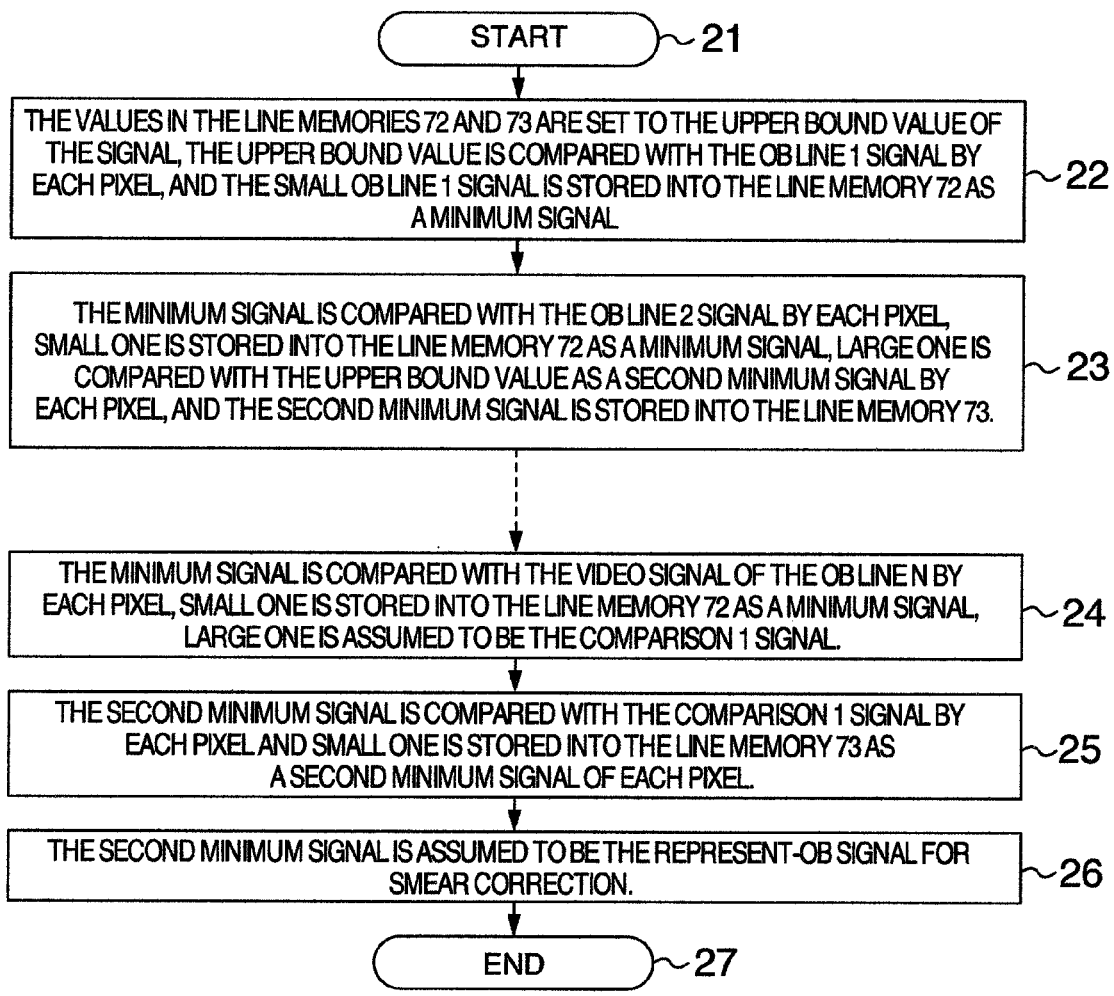

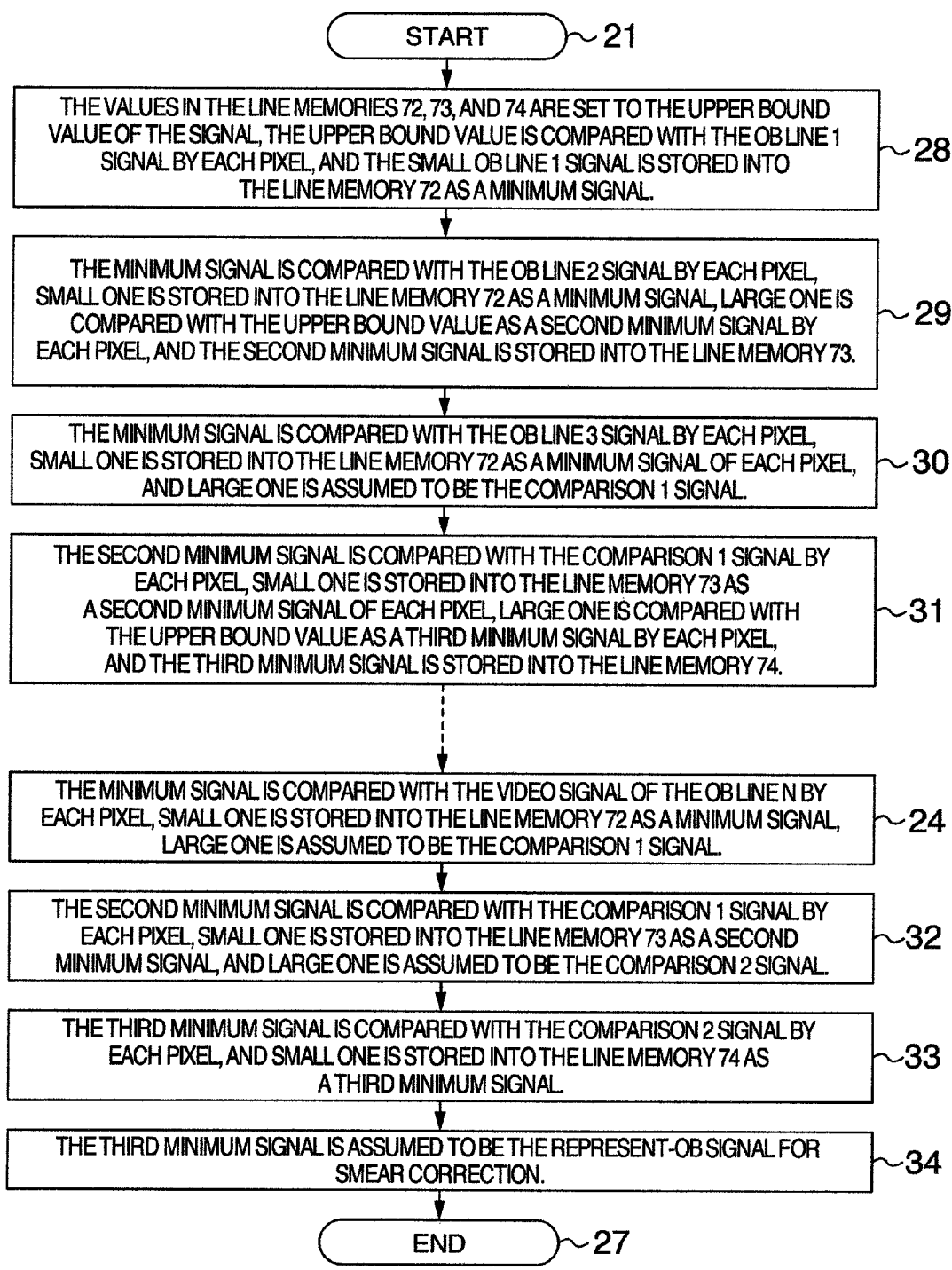

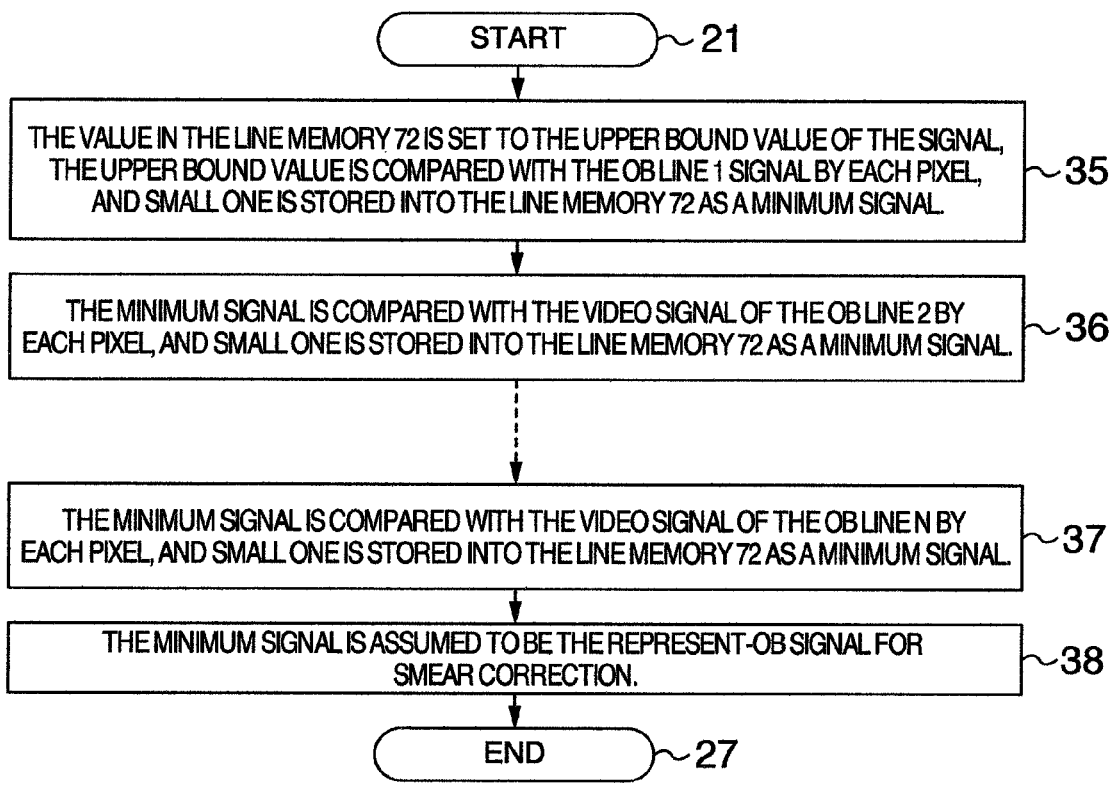

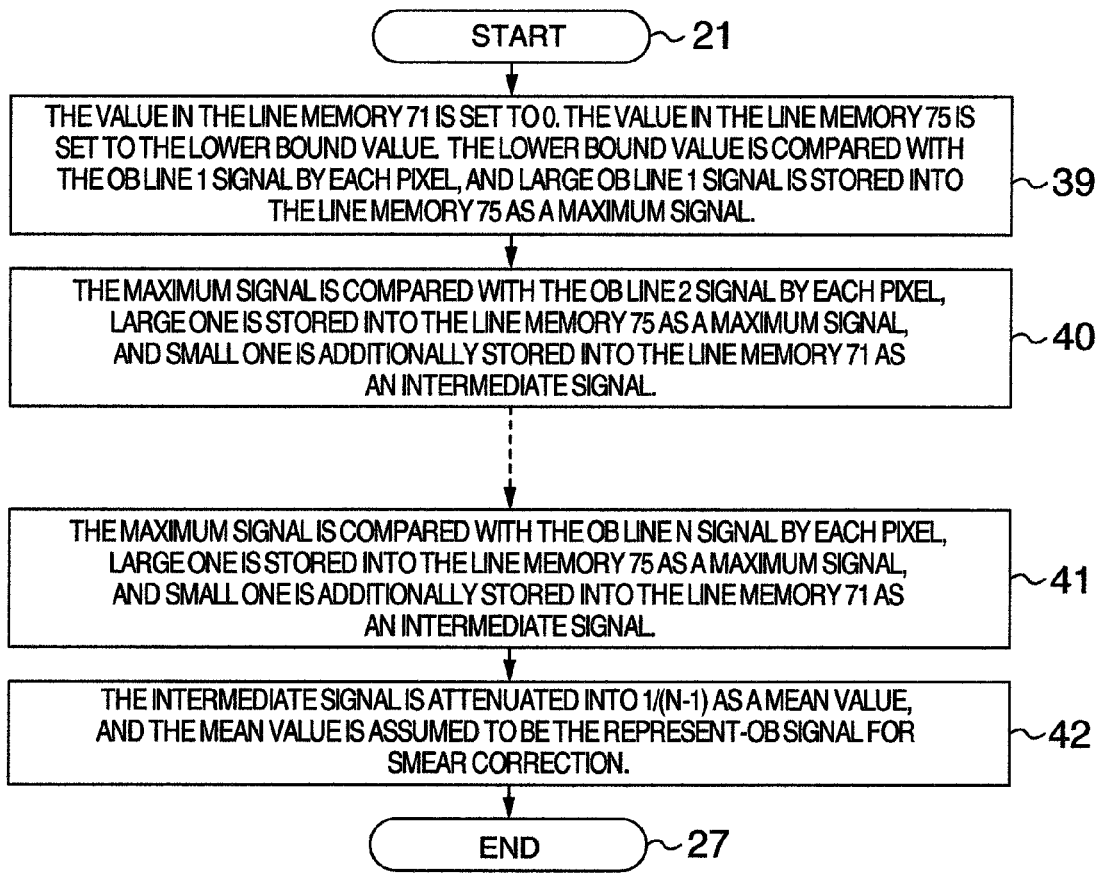

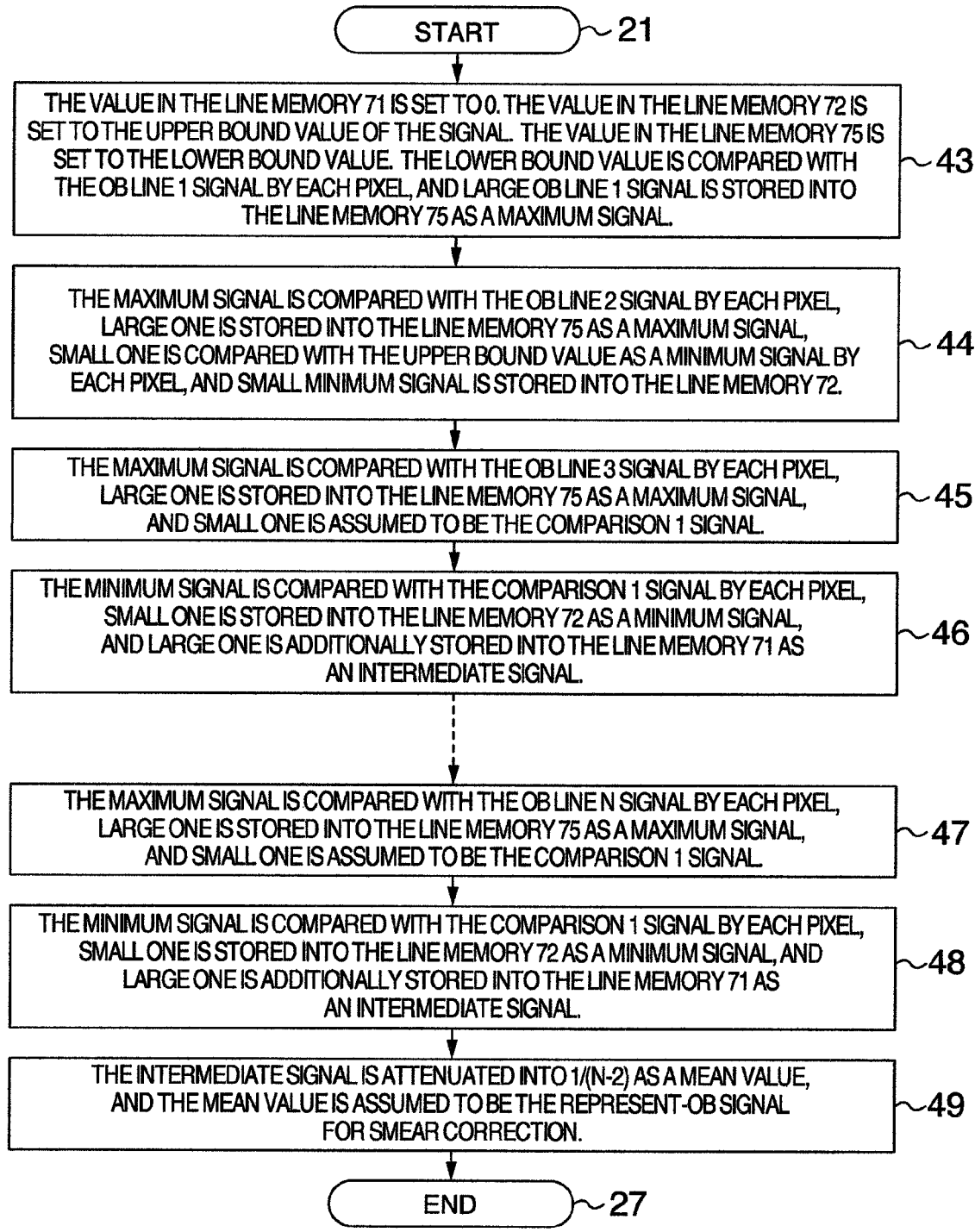

MEAN WITHOUT MAXIMUM & SECOND MAXIMUM OF V-OB

FIG. 3A
3-LINES V-OB

| V-OB SIGNAL LEVELS WITH SMEAR | 2<br>21 (WHITE BLEMISH)<br>4 |
|---|---|
| MEAN (CONVENTIONAL) | 9 |
| MEAN WITHOUT MAXIMUM | 3 |
| 2ND MINIMUM (CENTER) | 4 |
| MINIMUM | 2 |

FIG. 3B
5-LINES V-OB

| V-OB SIGNAL LEVELS WITH SMEAR | 2<br>5<br>3<br>21 (WHITE BLEMISH)<br>4 |
|---|---|
| MEAN (CONVENTIONAL) | 7 |
| MEAN WITHOUT MAXIMUM | 3.5 |
| 3RD MINIMUM (CENTER) | 4 |
| 2ND MINIMUM | 3 |
| MINIMUM | 2 |
| MEAN WITHOUT MAXIMUM & 2ND MAXIMUM | 3 |
| MEAN WITHOUT MAXIMUM, 2ND MAXIMUM, AND MINIMUM | 3.5 |
| MEAN WITHOUT MAXIMUM & MINIMUM | 4 |

FIG. 3C

2-LINES V-OB

| V-OB SIGNAL LEVELS WITH SMEAR | 2<br>21 (WHITE BLEMISH) |
|---|---|
| MEAN (CONVENTIONAL) | 11.5 |
| MINIMUM | 2 |

FIG. 3D

3-LINES V-OB

| V-OB SIGNAL LEVELS WITH SMEAR | 2<br>21 (WHITE BLEMISH)<br>4 |
|---|---|
| MEAN (CONVENTIONAL) | 9 |
| MEAN WITHOUT MAXIMUM | 3 |
| 2ND MINIMUM (CENTER) | 4 |
| MINIMUM | 2 |

FIG. 3E

4-LINES V-OB

| V-OB SIGNAL LEVELS WITH SMEAR | 21 (WHITE BLEMISH) 2 4 5 |
|---|---|
| MEAN (CONVENTIONAL) | 8 |
| MEAN WITHOUT MAXIMUM | 3.67 |
| 2ND MINIMUM | 4 |
| MINIMUM | 2 |
| MEAN WITHOUT MAXIMUM & 2ND MAXIMUM | 3 |
| MEAN WITHOUT MAXIMUM & MINIMUM | 4.5 |

FIG. 3F

4-LINES V-OB

| V-OB SIGNAL LEVELS WITH SMEAR | 21 (WHITE BLEMISH) 2 4 5 |
|---|---|
| MEAN (CONVENTIONAL) | 8 |
| MEAN WITHOUT MAXIMUM | 3.67 |
| 2ND MINIMUM | 4 |
| MINIMUM | 2 |
| MEAN WITHOUT MAXIMUM & 2ND MAXIMUM | 3 |
| MEAN WITHOUT MAXIMUM & MINIMUM | 4.5 |

3-LINES V-OB

5-LINES V-OB

2-LINES V-OB

3-LINES V-OB

4-LINES V-OB

4-LINES V-OB

IMAGE PICKUP DEVICE AND IMAGE PICKUP METHOD

INCORPORATION BY REFERENCE

The present application claims priority from Japanese application JP2006-259459 filed on Sep. 25, 2006, the content of which is hereby incorporated by reference into this application.

BACKGROUND OF THE INVENTION

1. Field of the Invention

The invention relates to an image pickup device having a solid-state image pickup device and, more particularly, to a method of reducing noises contained in an image signal which is outputted from an image pickup device.

2. Description of the Related Art

According to a CCD (Charge Coupled Device) image pickup device among solid-state image pickup devices, although sensitivity is high and an amount of white blemish is small, the white blemish upon photographing of the high sensitivity is large. According to the CCD image pickup device, when a high-luminance object such as a spotlight or the like is photographed, excess charges leak and flow into a vertical transfer path from a photodiode of a pixel which has photographed the spotlight, an image signal which is proportional to illuminance of the spotlight is multiplexed to all pixels in the same vertical direction as that of the pixel which has photographed the high-luminance object, and a white vertical line called a vertical smear occurs. If an accumulating surface is provided outside of an image pickup surface of the CCD image pickup device and a vertical transfer speed is raised, the vertical smear decreases. However, if the accumulating surface is provided, an area of the CCD image pickup device is increased and its costs rise. If the vertical transfer speed is raised, electric power consumption is also increased and the white blemish increases. Further, it is necessary to deeply form the photodiode in order to raise near-infrared sensitivity of the CCD image pickup device, so that the white blemish increases.

Hitherto, in order to reduce an influence of the white blemish of an optical black pixel portion, vertical pixel signals of outputs of 12 lines of a optical black pixel (Vertical-Optical Black; hereinbelow, abbreviated to "V-OB") portion of the CCD image pickup device are averaged and stored as a signal of one line, and the stored signal is subtracted from output signals of effective pixel portions of the solid-state image pickup device (refer to JP-A-7-067038).

Owing to an increase in integration degree of a digital signal processor, such a process for storing the output signals of a plurality of lines and arithmetically operating them can be easily realized not only in a memory integrated DSP for use of a video image but also in a reasonable general-purpose FPGA (Field Programmable Gate Array).

Further, an FEP (Front End Processor) having therein a CDS (Correlated Double Sampling) for removing noises from a signal outputted from the CCD, a dark current correction, an AGC (Automatic Gain Control), and an ADC (Analog Digital Converter) for converting the signal into a digital video signal Vi has been spread. Although a gradation of the ADC of the FEP has conventionally been equal to 10 bits, a gradation of 12 bits or 14 bits is generally used and a processor having a gradation of 16 bits has also been realized as a product. The FEP in which the gradation of the ADC is set to 22 bits and the AGC is arranged after the ADC has also been realized as a product.

Moreover, according to an Electron Multiplying—CCD (hereinbelow, abbreviated to "EM-CCD"), since the sensitivity can be raised by combining the EM-CCD with an electron cooling unit, quasi-motion image monitoring without an illumination for photographing at night using visible light and near-infrared rays can be performed.

SUMMARY OF THE INVENTION

A dark current variation increases due to a strong correlation with the realization of the high sensitivity of the CCD image pickup device and an increase in number of pixels, so that the white blemish and a level of a dark portion variation are liable to increase. Particularly, the CCD image pickup device for the high sensitivity or the CCD image pickup device for an HDTV (High Definition Television) uses the CCD image pickup device in which the levels of the white blemish and the dark portion variation are large except the CCD image pickup devices which have severely been selected. Moreover, some EM-CCDs have only four lines of the V-OB portion. In the HDTV, a (upper or lower) vertical blanking period is so short to be a time corresponding to the scan of 22.5 scanning lines [={1125 (the total number of scanning lines)−1080 (the number of effective scanning lines)}/2]. The number of lines of the upper side of the V-OB pixel portion is equal to 1 and the number of lines of the lower side of the V-OB pixel portion is equal to 3 or the like, so that a wide area cannot be assured.

Therefore, even if output signals of a plurality of lines of the V-OB portion of the CCD image pickup device are averaged, the white blemish component remains. Further, if the averaged signal (mean signal) is subtracted (subtracting process) from the output signals of the effective pixel portions in order to reduce the vertical smear of the white vertical stripes, black vertical stripes occur.

If the output signals of the lines in the V-OB portion of the CCD image pickup device are averaged in the horizontal direction, although the influence by the white blemish component decreases, an error component between excess and deficiency of a vertical smear correction increases. Therefore, even if the subtracting process is executed, the white vertical stripes remain and the black vertical stripes occur.

Further, since the vertical smear components of the CCD solid-state image pickup device increase even if the image signal is saturated, unless a level of the vertical smear correction is varied according to the saturation of the image signal, the error component between excess and deficiency of the vertical smear correction increases. Consequently, even if the subtracting process is executed, the white vertical stripes remain and the black vertical stripes occur.

Particularly, in the EM-CCD, although the sensitivity can be raised, the image signal containing a large amount of smear components is formed. Further, since the image signal reaches the high level, it is liable to be saturated in a signal circuit. Even if the EM-CCD is electronically cooled, the white blemish and the level of the dark portion variation are large at the time of the high-sensitivity operation. Thus, the error component between excess and deficiency of the vertical smear correction increases, the white vertical stripes remain, and the black vertical stripes occur. Thus, such a phenomenon becomes an obstacle to the night monitoring in which external illumination light of a high luminance directly enters a display screen.

It is an object of the invention to reduce white vertical stripes and black vertical stripes of an error component between excess and deficiency of a correction of a vertical smear which is outputted from a CCD image pickup device without using a severely-selected CCD image pickup device in which a white blemish and a dark portion variation are small.

To solve the above problems, according to the invention, there is provided a solid-state image pickup device comprising: a solid-state image pickup device; a first obtaining unit for obtaining image signals which are outputted from effective pixels of a photosensitive surface of the solid-state image pickup device; and a second obtaining unit for obtaining signals which are outputted from light-shielded pixels in an upper portion or a lower portion of the photosensitive surface of the solid-state image pickup device, wherein at least one of represent-value signals which are calculated from an N-th minimum value (N is a natural number) of vertical pixel signals of a plurality of lines of the signals which are outputted from the light-shielded pixels and obtained by the second obtaining unit, a mean value of values of an M-th maximum value (M is a natural number) and less of the vertical pixel signals and a value based on another M-th maximum value and less of the vertical pixel signals is calculated; and the represent-value signal is subtracted from the image signals which are outputted from the effective pixels and obtained by the first obtaining unit.

In the above image pickup method, the number of vertical lines of the larger number of pixels of either the light-shielded pixels in the upper portion or the light-shielded pixels in the lower portion of the photosensitive surface of the solid-state image pickup device is equal to, for example, one of 2, 3, and 4.

Further, in the above image pickup method, the solid-state image pickup device has a vertical dark portion variation correcting unit of the image signal, and the represent-value signal is calculated after a vertical dark portion variation of the signals outputted from the light-shielded pixels in the upper portion or the lower portion of the photosensitive surface of the solid-state image pickup device is corrected.

In the above image pickup method, the signals outputted from the solid-state image pickup device are A/D converted into signals of 12 bits or more, for example, 14 bits, the represent-value signal is calculated, and the represent-value signal is attenuated into the signal of a ratio within a range from 3/4 or more to less than 1, for example, 15/16 and the attenuated signal is subtracted from the image signals outputted from the effective pixels of the photosensitive surface of the solid-state image pickup device.

According to the invention, by calculating the represent-value such as an N-th value from the minimum value of the vertical pixel signals of a plurality of lines of the light-shielded V-OB or the like, that is, the represent value for eliminating the influences from the maximum value through the M-th maximum value, even if the non-selected CCD image pickup device in which the number of lines of the V-OB is small and the levels of the white blemish and the dark portion variation are large, the vertical smear correction signal from which the large dark current components such as a white blemish and the like have been eliminated can be detected. Further, by subtracting the vertical smear correction signal from the image signal without being horizontally averaged, the error component between excess and deficiency of the vertical smear correction decreases and the image signal in which the white vertical stripes and the black vertical stripes are inconspicuous is obtained.

The smear components of the CCD solid-state image pickup device increase even if the image signal is saturated. However, since the image signal is A/D converted into the signal of 12 bits or more, for example, 14 bits, the saturation amount of the image signal is decreased by 2 or more bits, for example, 4 bits as compared with that of the 10-bit A/D conversion in the related art. Therefore, a necessity to take a measure for coping with the saturation of the image signal of the smear component correction is small. Further, since the represent-value of the light-shielded pixels is attenuated into the signal of the ratio within a range from 3/4 or more to less than 1, for example, 15/16 and the attenuated value is subtracted, there is actually no need to take a measure for coping with the saturation of the image signal.

Thus, even if the CCD image pickup device of the HDTV in which the number of lines in the V-OB pixel portion is small or the EM-CCD in which the vertical smear components and the white blemish are also large is used, the vertical smear can be stably reduced and the picture quality is improved.

The other objects and methods of achieving the objects will be readily understood in conjunction with the description of embodiments of the present invention and the drawings.

BRIEF DESCRIPTION OF THE DRAWINGS

FIGS. 1A to 1F are block diagrams showing an image pickup device of a whole construction of an embodiment of the invention;

FIG. 1A shows the case where the V-OB has 3 or more lines and the second minimum value (center value in the 3 lines) is used;

FIG. 1B shows the case where the V-OB has 5 or more lines and the third minimum value (center value in the 5 lines) is used;

FIG. 1C shows the case where the V-OB has 2 or more lines and a digital AGC is used as a minimum value;

FIG. 1D shows the case where the V-OB has 3 or more lines and a mean value of the values excluding the maximum value is used;

FIG. 1E shows the case where the V-OB has 4 or more lines and a mean value of the values excluding the maximum value and the minimum value is used;

FIG. 1F shows the case where the V-OB has 4 or more lines and a mean value of the values excluding the maximum value and the second maximum value is used;

FIGS. 2A to 2F are flowcharts for detecting represent-values of the embodiment of the invention;

FIG. 2A is the flowchart for detecting the second minimum value of the V-OB as a represent-value;

FIG. 2B is the flowchart for detecting the third minimum value of the V-OB as a represent-value;

FIG. 2C is the flowchart for detecting the minimum value of the V-OB as a represent-value;

FIG. 2D is the flowchart for detecting the mean value of the values excluding the maximum value of the V-OB as a represent-value;

FIG. 2E is the flowchart for detecting the mean value of the values excluding the maximum value and the minimum value of the V-OB as a represent-value;

FIG. 2F is the flowchart for detecting the mean value of the values excluding the maximum value and the second maximum value of the V-OB as a represent-value;

FIGS. 3A to 3F are schematic diagrams showing the detection of smear values in the V-OB according to the embodiment of the invention and the related art;

FIGS. 3A and 3D show the case of the 3-lines V-OB;

FIG. 3B shows the case of the 5-lines V-OB;

FIG. 3C shows the case of the 2-lines V-OB;

FIGS. 3E and 3F show the case of the 4-lines V-OB;

FIGS. 4A and 4D show the case of the 3-lines V-OB;

FIG. 4B shows the case of the 5-lines V-OB;

FIG. 4C shows the case of the 2-lines V-OB; and

FIGS. 4E and 4F show the case of the 4-lines V-OB.

DETAILED DESCRIPTION OF THE EMBODIMENTS

An outline of an embodiment of an image pickup device of the invention will now be described with reference to FIGS. 1A to 1F of block diagrams showing the image pickup device of a whole construction of the embodiment of the invention and FIGS. 4A and 4F of schematic diagrams of display screens showing the detection of smear values in a V-OB according to an embodiment of the invention and the related art. After that, the operation of several embodiments of the invention will be described with reference to FIGS. 1A to 1F of the block diagrams showing the image pickup device of the whole construction of the embodiment of the invention and FIGS. 2A to 2F of flowcharts for detecting a represent-value of the embodiment of the invention.

Figure 1B:
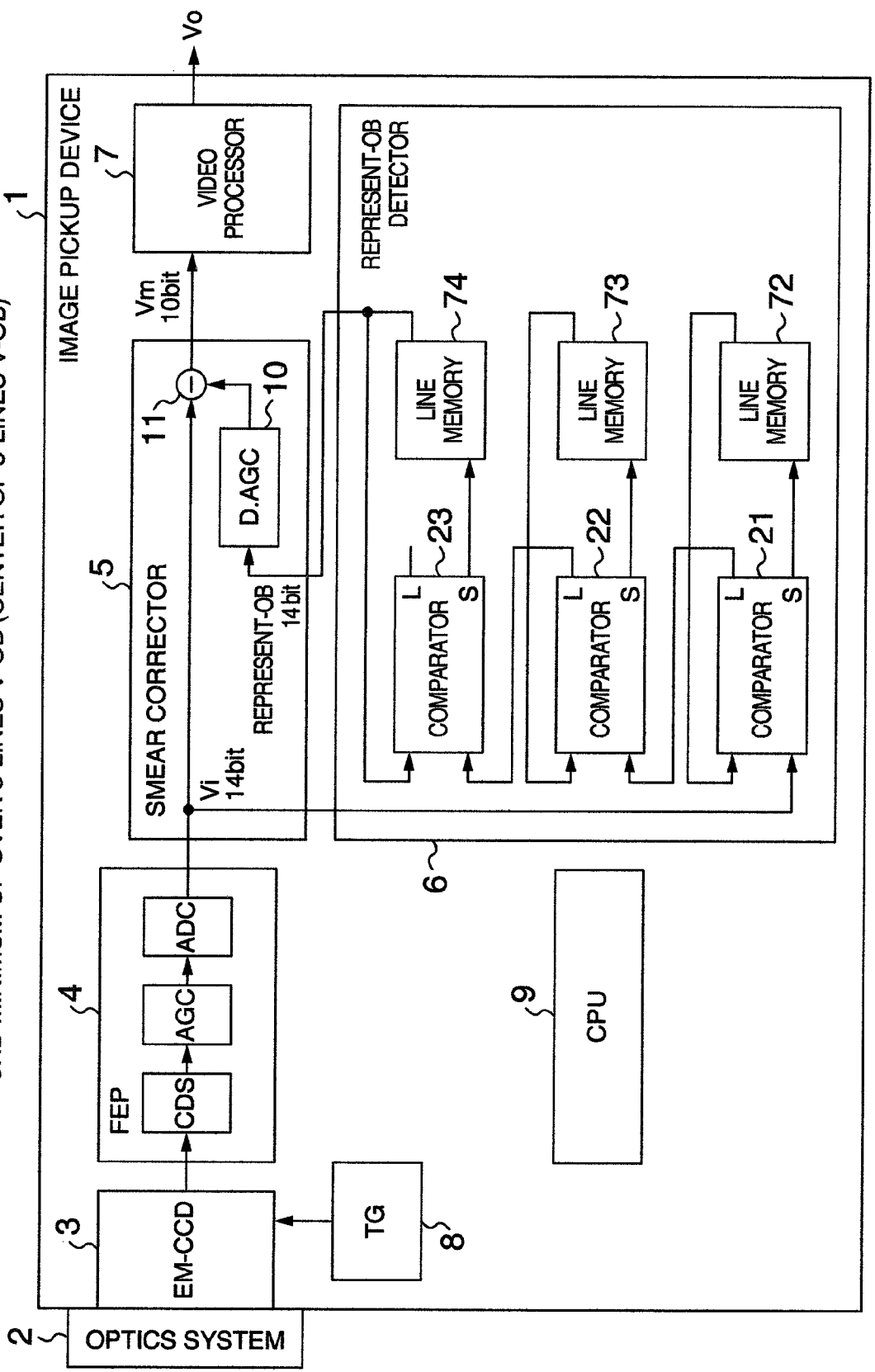
Figure 1D:
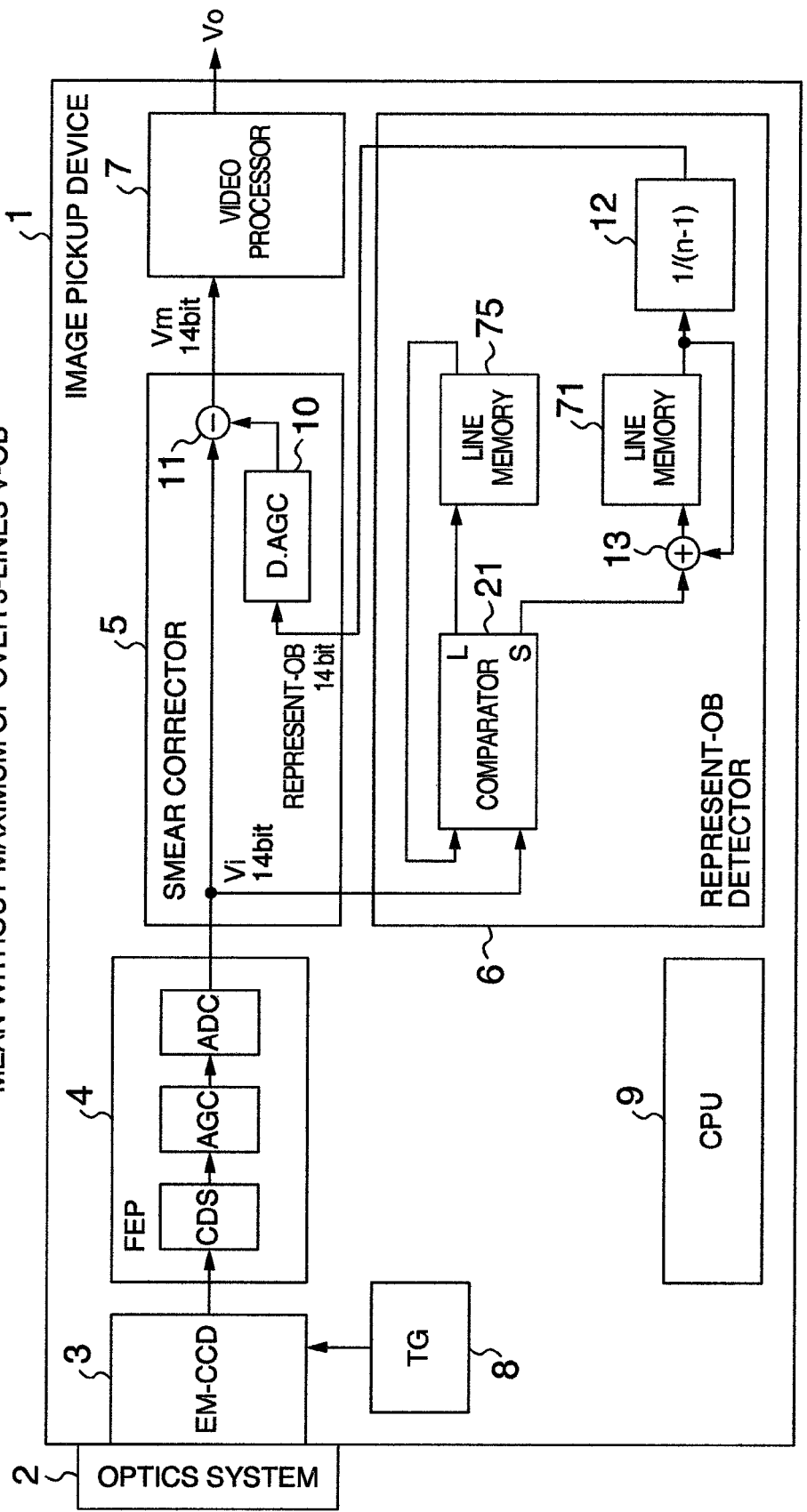
Figure 1F:
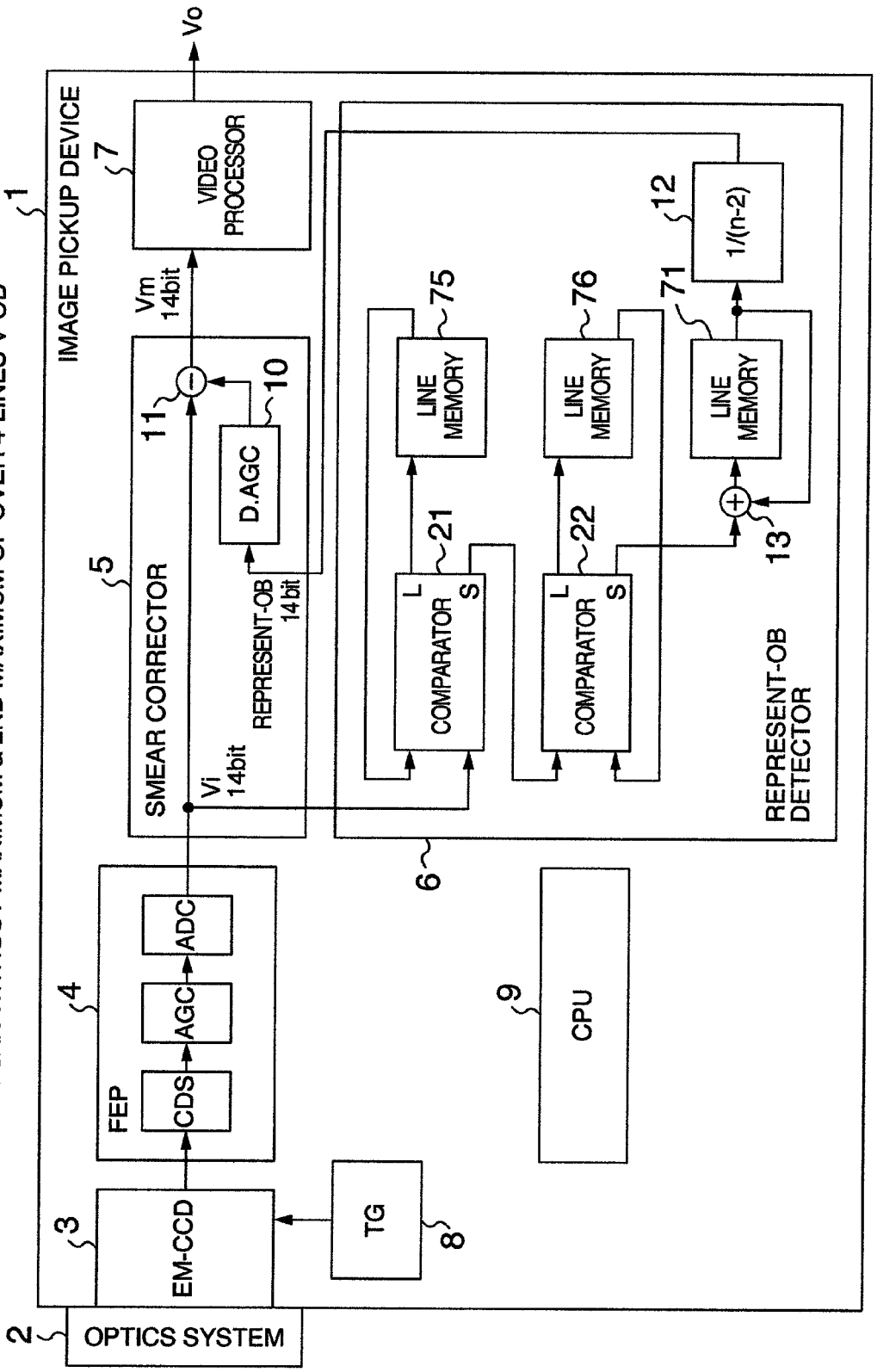
Figure 2F:
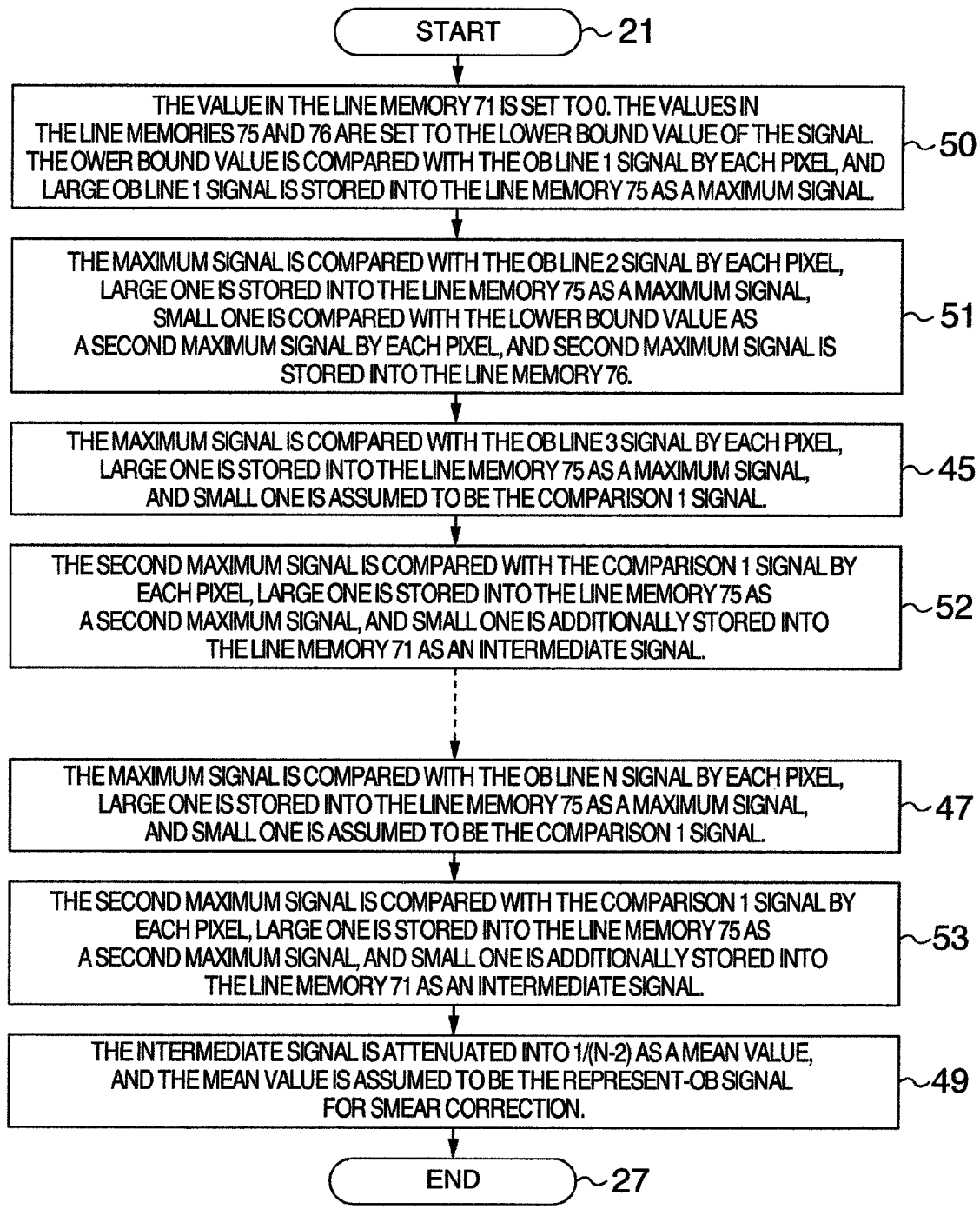

In FIGS. 1A to 1F of the block diagrams showing the image pickup device of the whole construction of the embodiment of the invention, FIG. 1A shows the case where the V-OB has 3 or more lines and the second minimum value (center value in the 3 lines) is detected, FIG. 1B shows the case where the V-OB has 5 or more lines and the third minimum value (center value in the 5 lines) is detected, FIG. 1C shows the case where the V-OB has 2 or more lines and the minimum value is detected and controlled by a digital-AGC, FIG. 1D shows the case where the V-OB has 3 or more lines and a mean value of the values excluding the maximum value is detected, FIG. 1E shows the case where the V-OB has 4 or more lines and a mean value of the values excluding the maximum value and the minimum value is detected, and FIG. 1F shows the case where the V-OB has 4 or more lines and a mean value of the values excluding the maximum value and the second maximum value is detected. In FIGS. 2A to 2F of the flowcharts for detecting the represent-value of the embodiment of the invention, FIG. 2A shows the case of detecting the second minimum value of the V-OB, FIG. 2B shows the case of detecting the third minimum value of the V-OB, FIG. 2C shows the case of detecting the minimum value of the V-OB, FIG. 2D shows the case of detecting the mean value of the values excluding the maximum value of the V-OB, FIG. 2E shows the case of detecting the mean value of the values excluding the maximum value and the minimum value of the V-OB, and FIG. 2F shows the case of detecting the mean value of the values excluding the maximum value and the second maximum value of the V-OB.

One of features in FIGS. 1A to 1F of the block diagrams showing the image pickup device of the whole construction of the embodiment of the invention is that the maximum value or the second maximum value is excluded by added comparators and line memory units, thereby eliminating an influence of a white blemish of a CCD image pickup device.

Figure 4A:
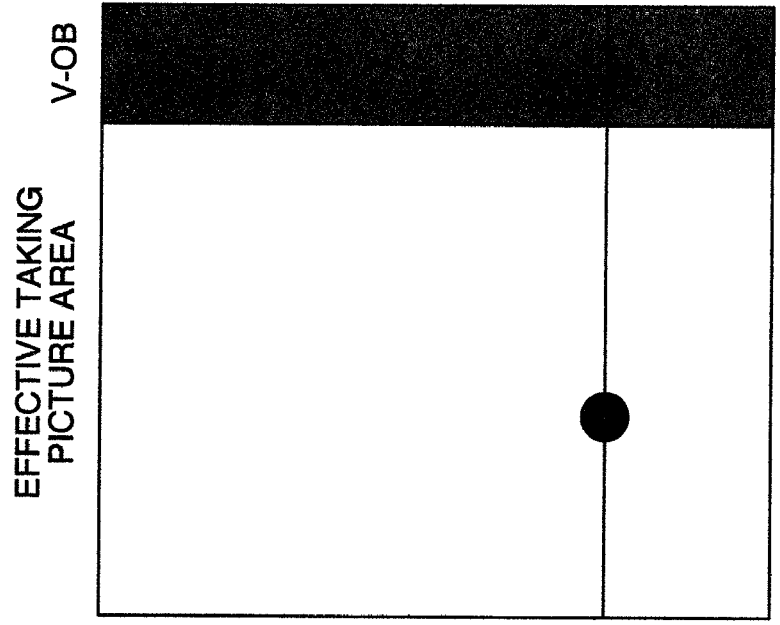
FIGS. 4A to 4F are schematic diagrams of display screens showing the detection of the smear values in the V-OB according to the embodiment of the invention and the related art.
Figure 4B:
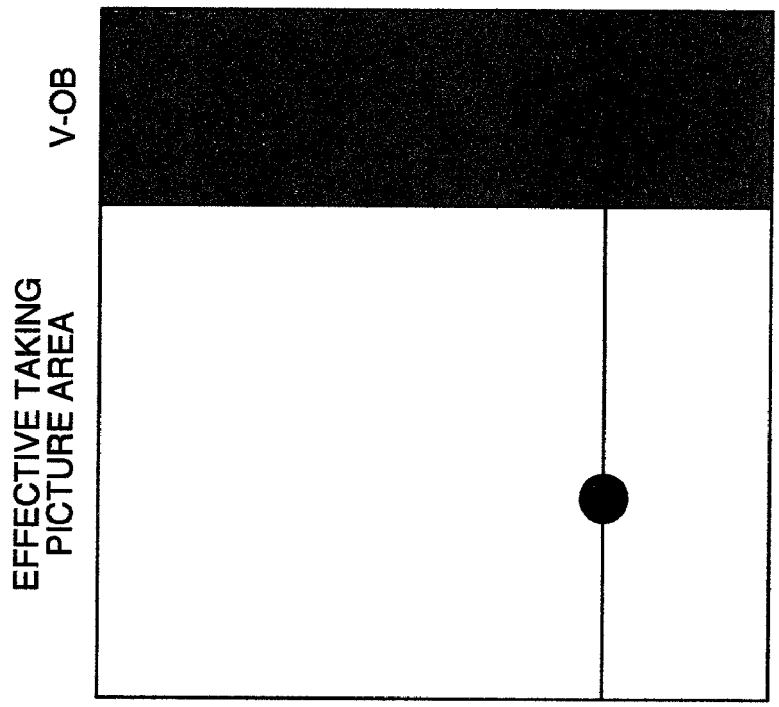
Figure 4C:
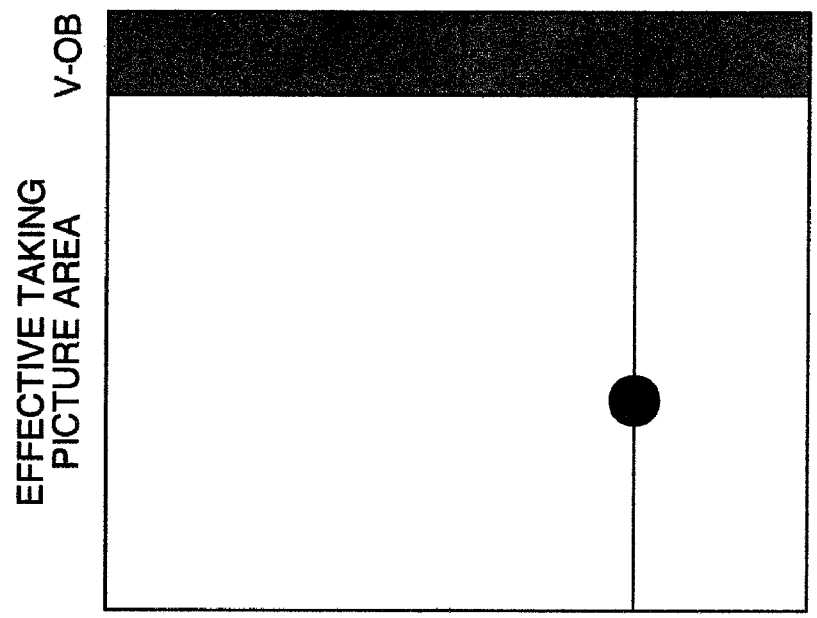
Figure 4D:
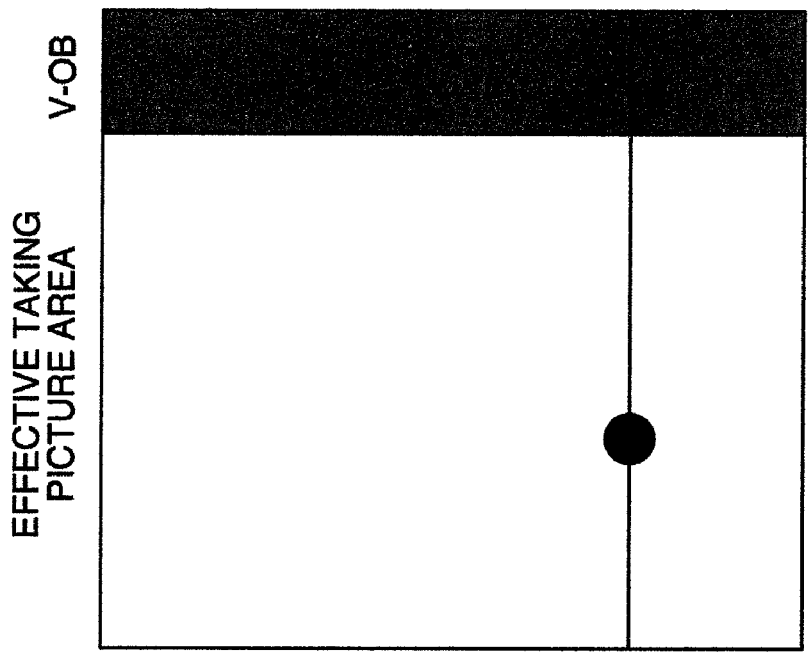
Figure 4E:
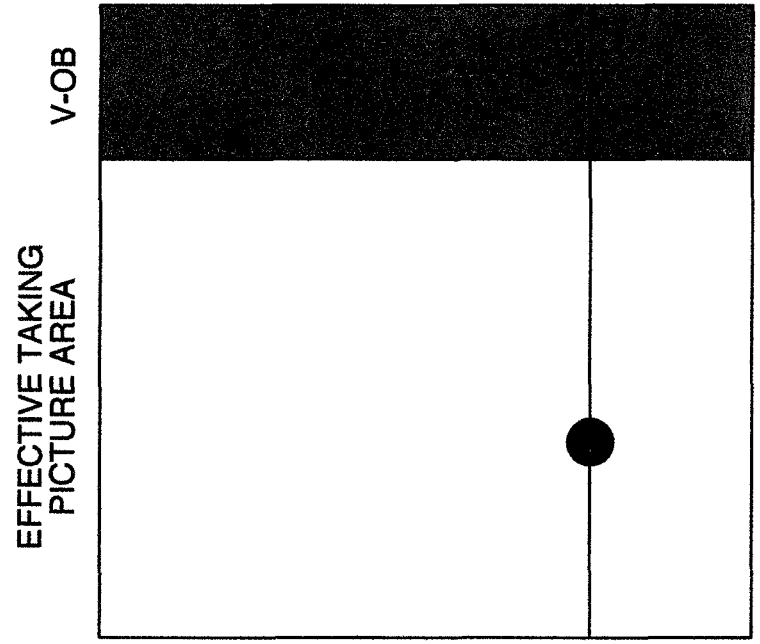
Figure 4F:
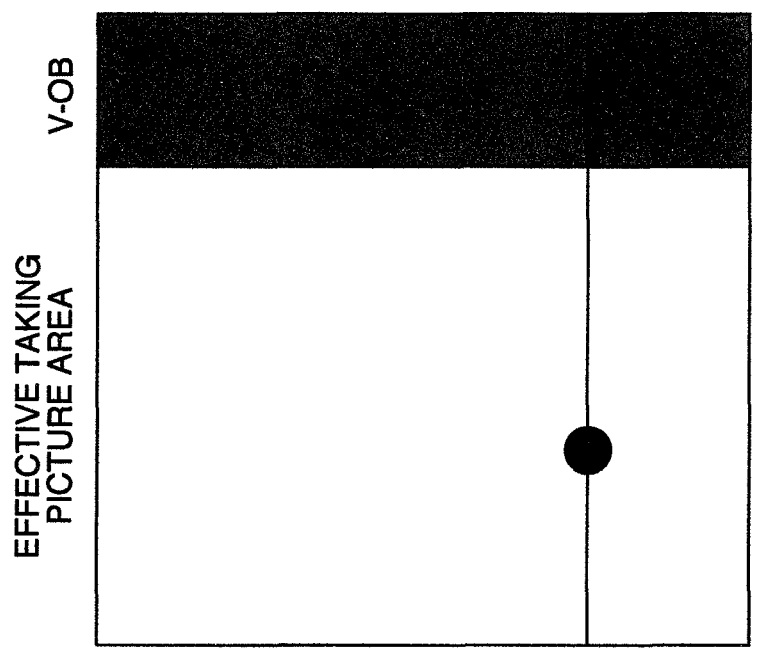

FIGS. 4A to 4F of the schematic diagrams of the display screens showing the detection of the smear values in the V-OB according to the embodiment of the invention and the related art and FIGS. 3A, 3B, 3C, 3D, 3E, and 3F of the schematic diagrams showing the detection of the smear values in the V-OB according to the embodiment of the invention and the related art correspond to FIGS. 1A, 1B, 1C, 1D, 1E, and 1F, respectively. FIGS. 1A and 1D show the case where the V-OB has 3 lines, FIG. 1B shows the case where the V-OB has 5 lines, FIG. 1C shows the case where the V-OB has 2 lines, and FIGS. 1E and 1F show the case where the V-OB has 4 lines, respectively. FIGS. 4A and 4F are the schematic diagrams of the display screens. A CCD image pickup surface is vertically and horizontally reversed from the display screen.

If the V-OB has a white blemish of a signal value 21 in 2 lines as shown in FIG. 3C, the mean value is particularly large to be equal to 11.5 and it will be understood that an error in smear correction is large (explanation will be made hereinbelow in the embodiment that a level of the maximum signal value which is determined to be the white blemish is assumed to be 21). If the V-OB has the white blemish of the signal value 21 in 3 lines as shown in FIGS. 3A and 3D, the mean value is equal to 9 and differs largely from the center value 4 and the mean value 3 of the values excluding the maximum value. If the V-OB has the white blemish of the signal value 21 in 4 lines as shown in FIGS. 3E and 3F, the mean value is equal to 8 and differs largely from the mean value 3.67 of the values excluding the maximum value. If the V-OB has the white blemish of the signal value 21 in 5 lines as shown in FIG. 3B, the mean value is equal to 7 and differs largely from the center value 4 and the mean value 3.5 of the values excluding the maximum value. Therefore, it will be understood that even if the number of lines of the V-OB increases slightly, an error of the mean value that is caused by the smear correction is large. In FIGS. 3A to 3F, although the minimum value in the embodiment is equal to 2 and smaller than the center value and the mean value of the values excluding the maximum value by 1 to 2, its error is not so larger than the error of 7 to 11.5 of the mean value in the related art. It will be understood that even when the number of lines of the V-OB is so small to be 2, an error of the minimum value that is caused by the smear correction is smaller than that of the 5-lines V-OB in the related art, so that it is practical.

In FIGS. 1A to 1F of the block diagrams showing the image pickup device of the whole construction of the embodiment of the invention, reference numeral 1 denotes an image pickup device; 2 an optics system such as a lens and the like for forming an image from incident light; and 3 a CCD image pickup device such as CCD, EM-CCD, or the like for converting the incident light from the optics system 2 into an electric signal. A front end processor FEP 4 comprises: a CDS for removing noises from the signal outputted from the CCD image pickup device 3; an AGC for correcting a dark current and controlling a gain of the signal; and an ADC for converting the input signal into the digital video signal Vi (it is also possible to use such a construction that the AGC is not included in the FEP as shown in FIG. 1C or 1E). Reference numeral 5 denotes a smear corrector for subtracting a represent-OB value signal from the digital video signal Vi, thereby correcting smear components; 6 a represent-OB detector for detecting a represent-value signal of the V-OB of the digital video signal Vi; 21 to 23 comparators each for comparing every pixel of the V-OB lines of the digital video signal Vi; 71 to 76 line memories each for storing the represent-OB value; and 11 a subtractor for subtracting the represent-value signal from a video signal. Reference numeral 7 denotes a video processor (video signal processing unit) for executing various image processes to a signal Vm outputted from the smear corrector 5, converting the signal into a composite video signal (Video Burst Sync; hereinbelow, abbreviated to "VBS") or an SDI (Serial Digital Interface) video signal of the NTSC (National Television System Committee) system or the PAL (Phase Alternating by Line) system or a video signal of a predetermined system such as an SDI of the HDTV (HD-SDI) or the like, and outputting. Reference numeral 8 denotes a CCD driver (or also referred to as TG) for driving the EM-CCD 3 and making electron multiplying gain control. The CCD driver 8 mainly has: a timing generator (TG) for generating a timing signal to drive the EM-CCD; and a driver for driving the generated timing signal. Reference numeral 9 denotes a CPU (Central Processing Unit) for controlling each unit in the image pickup device 1 (control lines from the CPU to the respective units are not illustrated). Reference numeral 10 denotes a digital AGC (D.AGC) for controlling an amplification degree of its own D.AGC while matching the represent-OB value signal with an amplification degree of the AGC of the FEP.

The operation of the embodiment of the invention will now be described with reference to FIGS. 1A to 1F. In the EM-CCD 3 (or CCD 3) of the image pickup device 1, the incident light formed as an image onto the photosensitive surface by the optics system 2 is photoelectrically converted by the photodiode so as to form signal charges, the signal charges are vertically transferred, and thereafter, the signal charges are electron-multiplied while being horizontally transferred and outputted to the FEP 4. The FEP 4 removes the noises from the signal outputted from the EM-CCD 3, corrects the dark current components, amplifies the corrected signal, converts into the digital video signal Vi, and outputs the digital video signal Vi to the smear corrector 5. The digital video signal Vi is sent to the represent-OB detector 6 through the smear corrector 5 and also sent to the subtractor 11 in order to execute signal processes, which will be explained hereinafter. In the represent-OB detector 6, the digital video signal Vi is compared by the comparators 21 to 23 every vertical pixel signal of the V-OB lines, comparison results are stored into the line memories 71 to 76 in ascending order, and the represent-OB value signal is detected as smear components.

Or, like an embodiment shown in FIGS. 1D to 1F, it is also possible to construct in such a manner that the vertical pixel signals of the V-OB lines which satisfy a predetermined reference are selected by using the comparators 21 and 22 and the line memories 72, 75, and 76, the selected vertical pixel signals are added by using an adding unit 13, an addition result is stored into the line memory 71, and the represent-OB value signal as a mean value is calculated by an averaging unit 12.

In the smear corrector 5, the represent-OB value signal is amplified by the D.AGC 10 according to the amplification degree of the AGC of the FEP and the subtractor 11 subtracts the amplified signal from the digital video signal Vi and outputs the digital video signal Vm to the video processor 7. The video processor 7 executes various image processes to the digital video signal Vm, converts into a video signal Vo of a predetermined method, and outputs the video signals Vo.

Further, the CCD driver (TG) 8 outputs a signal for driving the EM-CCD 3 in accordance with a control signal (not shown) which is outputted from the CPU 9. In the embodiment shown in FIGS. 1C and 1E, since there is no AGC in the FEP 4, it is constructed in such a manner that after the represent-OB value signal was subtracted from the digital video signal Vi by the smear corrector 5, the digital AGC is performed.

In the embodiments illustrated in FIGS. 1A to 1F, although there are various embodiments such as embodiment in which the AGC is not included in the FEP, embodiment in which the a layout position of the D.AGC of the smear corrector differs, embodiment in which the number of bits of the digital video signal Vi or Vm and the number of bits of the represent-OB value signal differ, embodiment in which the constructions of the comparators and the line memory units differ, and the like, those embodiments are shown merely as one embodiment and other various constructions may be applied.

The operation for detecting and correcting the vertical smear signal will now be described with reference to FIGS. 1A to 1F, 2A to 2F, 3A to 3F, and 4A to 4F.

First, the embodiments shown in FIGS. 1A, 2A, 3A, and 4A will be described. The CPU 9 sets an upper bound value of the minimum value signal and an upper bound value of the second minimum value signal into the line memory units 72 and 73, respectively. As such upper bound values, for example, values obtained by converting luminance of the signals into numerical values may be used (with respect to values, which will be mentioned hereinbelow, they are also shown by converting into numerical values in accordance with a similar reference). The comparator 21 compares the upper bound value stored in the line memory unit 72 with the value of the pixel of the video signal of the first line (hereinbelow, referred to as V-OB1) of the V-OB area by each pixel and stores the signal of the smaller value (video signal of the V-OB1) into the line memory unit 72 as a signal of the minimum value of each pixel (steps 21 and 22). The comparator 21 compares the value of the pixel of the video signal of the V-OB2 with the value of the signal of the minimum value in the line memory unit 72 by each pixel and stores the signal of the smaller value into the line memory unit 72 as a signal of the minimum value of each pixel. The signal of the larger value is sent to the comparator 22. The comparator 22 compares the value of the signal of the larger value with the upper bound value stored in the line memory unit 73 as a signal of the second minimum value by each pixel and stores the signal of the smaller value into the line memory unit 73 as a signal of the second minimum value of each pixel (step 23). Similarly, the comparator 21 compares the value of the pixel of the video signal of the V-OBN of the N-th line (N is a natural number of 3 or more) with the minimum value in the line memory unit 72 by each pixel and stores the signal of the smaller value into the line memory unit 72 as a signal of the minimum value of each pixel. The signal of the larger value is sent to the comparator 22 as a signal of Comparison 1 (step 24). The comparator 22 compares the value of the second minimum signal with the value of the signal of Comparison 1 by each pixel and stores the signal of the smaller value into the line memory unit 73 as a signal of the second minimum value of each pixel (step 25). When the comparator 22 finishes the comparing process of the last V-OB, the line memory unit 73 outputs the signal of the second minimum value to the smear corrector 5 as a represent-OB value signal for the smear correction (step 26). The represent-value detecting process is finished (step 27).

Subsequently, the embodiment shown in FIGS. 1B, 2B, 3B, and 4B will be described. The CPU 9 sets the upper bound value of the minimum value signal, the upper bound value of the second minimum value signal, and the upper bound value of the third minimum value signal into the line memory units 72, 73, and 74, respectively. The comparator 21 compares the upper bound value stored in the line memory unit 72 with the value of the pixel of the video signal of the V-OB1 by each pixel and stores the signal of the smaller value (video signal of the V-OB1) into the line memory unit 72 as a signal of the minimum value (steps 21 and 22). The comparator 21 compares the value of the signal of the minimum value with the value of the pixel of the video signal of the V-OB2 by each pixel and stores the signal of the smaller value into the line memory unit 72 as a signal of the minimum value of each pixel (step 28). The comparator 22 compares the value of the signal of the larger value with the upper bound value stored in the line memory unit 73 as a signal of the second minimum value of each pixel by each pixel and stores the signal of the smaller value into the line memory unit 73 as a signal of the second minimum value (step 29). The comparator 21 compares the value of the signal stored in the line memory unit 72 with the value of the video signal of the V-OB3 by each pixel and stores the signal of the smaller value into the line memory unit 72 as a signal of the minimum value of each pixel. The signal of the larger value is sent to the comparator 22 as a signal of Comparison 1 (step 30). The comparator 22 compares the value of the second minimum signal stored in the line memory unit 73 with the value of the signal of Comparison 1 by each pixel and stores the signal of the smaller value into the line memory unit 73 as a signal of the second minimum value of each pixel. The comparator 23 compares the signal of the larger value with the upper bound value stored in the line memory unit 74 as a signal of the third minimum value by each pixel and stores the signal of the smaller value into the line memory unit 74 as a signal of the third minimum value of each pixel (step 31). Similarly, the value of the pixel of the video signal of the V-OBN of the N-th line (N is the natural number of 4 or more) and the minimum value in the line memory unit 72 are compared by each pixel. The signal of the smaller value is stored into the line memory unit 72 as a signal of the minimum value of each pixel. The signal of the larger value is sent to the comparator 22 as a signal of Comparison 1 of each pixel (step 24). The comparator 22 compares the value of the second minimum signal with the value of the signal of Comparison 1 by each pixel and stores the signal of the smaller value into the line memory unit 73 as a signal of the second minimum value of each pixel. The signal of the larger value is sent to the comparator 23 as a signal of Comparison 2 of each pixel (step 32). The comparator 23 compares the value of the third minimum signal with the value of the signal of Comparison 2 by each pixel and stores the signal of the smaller value into the line memory unit 74 as a signal of the third minimum value of each pixel (step 33). When the comparator 23 finishes the comparing process of the last V-OB, the line memory unit 74 outputs the signal of the third minimum value to the smear corrector 5 as a represent-OB value signal for the smear correction (step 34). The represent-value signal detecting process is finished (step 27).

Further, the embodiment shown in FIGS. 1C, 2C, 3C, and 4C will be described. The CPU 9 sets the upper bound value of the minimum value signal into the line memory unit 72. The comparator 21 compares the upper bound value with the value of the pixel of the video signal of the V-OB1 by each pixel and stores the signal of the smaller value (video signal of the V-OB1) into the line memory unit 72 as a signal of the minimum value (steps 21 and 35). The comparator 21 compares the value of the signal of the minimum value with the value of the pixel of the video signal of the V-OB2 by each pixel and stores the signal of the smaller value into the line memory unit 72 as a signal of the minimum value of each pixel (step 36). Similarly, the comparator 21 compares the value of the pixel of the video signal of the V-OBN of the N-th line (N is the natural number of 3 or more) with the value of the signal of the minimum value by each pixel and stores the signal of the smaller value into the line memory unit 72 as a signal of the minimum value (step 37). When the comparator 21 finishes the comparing process of the last V-OB, the line memory unit 72 outputs the signal of the minimum value to the smear corrector 5 as a represent-OB value signal for the smear correction (step 38). The represent-value detecting process is finished (step 27).

The embodiment shown in FIGS. 1D, 2D, 3D, and 4D will be described. The CPU 9 sets the value in the line memory unit 71 to 0 and sets the value in the line memory unit 75 to a lower bound value of the signal. The comparator 21 compares the lower bound value with the value of the video signal of the V-OB1 by each pixel and stores the signal of the larger value (video signal of the V-OB1) into the line memory unit 75 as a signal of the maximum value of each pixel (steps 21 and 39). The comparator 21 compares the signal of the maximum value with the value of the pixel of the video signal of the V-OB2 by each pixel and stores the signal of the larger value into the line memory unit 75 as a signal of the maximum value. The adding unit 13 adds and stores the signal of the smaller value into the line memory unit 71 as an intermediate value (step 40). Similarly, the comparator 21 compares the value of the pixel of the video signal of the V-OBN of the N-th line (N is the natural number of 3 or more) with the signal of the maximum value by each pixel and stores the signal of the larger value into the line memory unit 75 as a signal of the maximum value. The adding unit 13 adds and stores the signal of the smaller value into the line memory unit 71 as an intermediate value (step 41). When the comparator 21 finishes the comparing process of the last V-OB, the line memory unit 71 outputs the added and stored value to the averaging unit 12. The averaging unit 12 attenuates the signal of the intermediate value into 1/(N−1), calculates a mean value, and outputs the mean value to the smear corrector 5 as a represent-OB value signal for the smear correction (step 42). The represent-value detecting process is finished (step 27).

The embodiment shown in FIGS. 1E, 2E, 3E, and 4E will be described. The CPU 9 sets the value in the line memory unit 71 to 0, sets the value in the line memory unit 72 to a lower bound value of the signal, and sets the value in the line memory unit 75 to a lower bound value of the signal, respectively. The comparator 21 compares the lower bound value with the value of the pixel of the video signal of the V-OB1 by each pixel and stores the signal of the larger value (video signal of the V-OB1) into the line memory unit 75 as a signal of the maximum value of each pixel (steps 21 and 43). The comparator 21 compares the signal of the maximum value with the value of the pixel of the video signal of the V-OB2 by each pixel and stores the signal of the larger value into the line memory unit 75 as a signal of the maximum value. The signal of the smaller value is sent to the comparator 22 as a signal of the minimum value of each pixel. The comparator 22 compares the signal of the smaller value with the upper bound value stored in the line memory unit 72 by each pixel and stores the signal of the smaller value into the line memory unit 72 as a signal of the minimum value of each pixel (step 44). The comparator 21 compares the value of the signal of the maximum value stored in the line memory unit 75 with the value of the pixel of the video signal of the V-OB3 by each pixel and stores the signal of the larger value into the line memory unit 75 as a signal of the maximum value. The comparator 21 sends the signal of the smaller value to the comparator 22 as a signal of Comparison 1 (step 45). The comparator 22 compares the value of the signal of the minimum value with the value of the signal of Comparison 1 by each pixel, stores the signal of the smaller value into the line memory unit 72 as a signal of the minimum value, and adds and stores the signal of the larger value into the line memory unit 71 as an intermediate value through the adding unit 13 (step 46). Similarly, the comparator 21 compares the value of the pixel of the video signal of the V-OBN of the N-th line (N is a natural number of 4 or more) with the value of the signal of the maximum value by each pixel, stores the signal of the larger value into the line memory unit 75 as a signal of the maximum value, and sends the signal of the smaller value to the comparator 22 as a signal of Comparison 1 (step 47). The comparator 22 compares the value of the signal of the minimum value with the value of the signal of Comparison 1 by each pixel, stores the signal of the smaller value into the line memory unit 72 as a signal of the minimum value, and adds and stores the signal of the larger value into the line memory unit 71 as an intermediate value through the adding unit 13 (step 48). When the comparator 22 finishes the comparing process of the last V-OB, the line memory unit 71 outputs the added and stored value to the averaging unit 12. The averaging unit 12 attenuates the signal of the intermediate value into 1/(N−2), calculates a mean value, and outputs the mean value to the smear corrector 5 as a represent-OB value signal for the smear correction (step 49). The represent-value detecting process is finished (step 27).

The embodiment shown in FIGS. 1F, 2F, 3F, and 4F will be described. The CPU 9 sets the value in the line memory unit 71 to 0 and sets the values in the line memory units 75 and 76 to the lower bound value of the signal. The comparator 21 compares the lower bound value with the value of the pixel of the video signal of the V-OB1 by each pixel and stores the signal of the larger value (video signal of the V-OB1) into the line memory unit 75 as a signal of the maximum value (steps 21 and 50). The comparator 21 compares the value of the maximum signal with the value of the pixel of the video signal of the V-OB2 by each pixel and stores the signal of the larger value into the line memory unit 75 as a signal of the maximum value. The signal of the smaller value is sent to the comparator 22 as a signal of the second maximum value of each pixel. The comparator 22 compares the signal of the smaller value with the lower bound value stored in the line memory unit 76 by each pixel and stores the signal of the smaller value into the line memory unit 76 as a signal of the second maximum value of each pixel (step 51). The comparator 21 compares the value of the signal of the maximum value stored in the line memory unit 75 with the value of the pixel of the video signal of the V-OB3 by each pixel and stores the signal of the larger value into the line memory unit 75 as a signal of the maximum value. The comparator 21 sends the signal of the smaller value to the comparator 22 as a signal of Comparison 1 (step 45). The comparator 22 compares the value of the second maximum signal with the value of the signal of Comparison 1 by each pixel, stores the signal of the larger value into the line memory unit 75 as a signal of the second maximum value, and adds and stores the signal of the smaller value into the line memory unit 71 as an intermediate value through the adding unit 13 (step 52). Similarly, the comparator 21 compares the value of the pixel of the video signal of the V-OBN of the N-th line (N is a natural number of 4 or more) with the value of the signal of the maximum value by each pixel, stores the signal of the larger value into the line memory unit 75 as a signal of the maximum value, and sends the signal of the smaller value to the comparator 22 as a signal of Comparison 1 (step 47). The comparator 22 compares the value of the second maximum signal with the value of the signal of Comparison 1 by each pixel, stores the signal of the larger value into the line memory unit 75 as a signal of the second maximum value, and adds and stores the signal of the smaller value into the line memory unit 71 as an intermediate value through the adding unit 13 (step 53). When the comparator 22 finishes the comparing process of the last V-OB, the line memory unit 71 outputs the added and stored value to the averaging unit 12. The averaging unit 12 attenuates the signal of the intermediate value into 1/(N−2), calculates a mean value, and outputs the mean value to the smear corrector 5 as a represent-OB value signal for the smear correction (step 49). The represent-value detecting process is finished (step 27).

In the embodiments shown in FIGS. 1A and 1B, after the gain of the represent-OB value signal was varied in accordance with the AGC of the FEP 4, the signal attenuated into 15/16 is subtracted from the signal Vi, and the signal Vm from which the vertical smear signal has been reduced is outputted. Although the smear components of the CCD image pickup device increase even if the image signal is saturated, since the image signal has been A/D converted into 14 bits, there is a surplus of 4 bits with respect to the saturation of the image signal as compared with the 10-bit A/D conversion in the related art. Therefore, the necessity to take a measure for coping with the saturation of the image signal of the smear component correction is small. Further, since the represent-value of the light-shielded pixels is attenuated into 15/16 and subtracted, the necessity to take a measure for coping with the saturation of the image signal decreases.

Although an attenuation ratio has been set to 15/16 in the embodiment, such an arbitrary value that the process for coping with the saturation of the image signal of the smear component correction (for example, linear process) can be executed can be used. Generally, any value within a range from $(2^p-s)/(2^p)$ or more to less than 1 may be used so long as the A/D conversion can be performed at resolution which is redundant by p bits or more. Here, $2^p$ means that 2 is raised to p-th power. p and s denote natural numbers and s is smaller than p. Although a value of s is preferably set to 1, it is not limited to 1. When the image signal for correction of the smear components reaches a saturation area, it is necessary to take non-linear characteristics into consideration. In the embodiment, therefore, such a construction that the image signal is approximated by a linear signal in which an inclination of a linear area of the image signal for correction of the smear components has slightly been attenuated and the process can be executed by the linear signal until the saturation area is used. For example, if the A/D conversion can be performed at the resolution which is higher by 4 bits, such resolution corresponds to a surplus of $2^4=16$ times. Therefore, the attenuation ratio of the value of 15/16 in which the inclination has slightly been attenuated is used in the embodiment. Like an embodiment shown in FIG. 1C, in the case of A/D converting into 16 bits, since a surplus of 6 bits is obtained, the subtractor 11 can subtract the represent-value of the light-shielded pixels attenuated into 63/64. The necessity to take a measure for coping with the saturation of the image signal is practically eliminated. If the sensitivity at the time of converting the signal charges of the CCD solid-state image pickup device into a voltage is raised, the signal is A/D converted into 22 bits as shown in FIG. 1F, and the dark current of the CCD image pickup device is corrected, the necessity to take a measure for coping with the saturation of the image signal is almost eliminated.

Further, the embodiment shown in FIGS. 1B, 2B, 3B, and 4B shows the method whereby the third minimum value of each vertical pixel signal is used as a represent-value. Not only there is no influence of the white blemish but also there is hardly an influence of a black blemish as a pixel defect in which the dark current is extremely small. Such a method is suitable for such an environment for monitoring that it is difficult to use a severely-selected expensive CCD image pickup device, particularly, for the EM-CCD. Since there are hardly influences of the white blemish and the black blemish, a circuit for detecting the presence or absence of the occurrence of the vertical smear can be omitted. A circuit for discarding the vertical smear correction signal of a small level adapted to prevent black vertical stripes which are caused by the erroneous detection of the vertical smear can be also omitted. In the embodiment shown in FIG. 1B, the signal Vm which is inputted to the video processor 7 after the represent-OB value signal was subtracted from the signal Vi is converted into 10 bits so as to match with the number of input bits of the video processor 7 of a low price which is frequently used for the monitoring application. To maintain the vertical smear correcting precision, the number of output bits of the FEP 4 is set to 14 bits.

FIGS. 1C, 2C, 3C, and 4C relate to another embodiment of the invention and show a method of calculating the minimum value of each vertical pixel signal as a represent-V-OB value. As a storing capacity for the vertical smear correction signal, it is sufficient to use the capacity corresponding to one line. An integration scale can be reduced more than that in the related art. The embodiment is suitable for the CCD image pickup device of the HDTV in which the number of V-OB lines is small and an amount of black blemish is also small. Further, although there is no AGC, since the 16-bit FEP is used, the vertical smear correcting precision is high. If the comparators 22 and 23 and the line memories 72 and 73 in FIGS. 1A and 1B are omitted and the operation as shown in FIG. 2C is executed, the invention can be used for such a high-sensitivity application that the CCD image pickup device of the HDTV in which the number of V-OB lines is small and an amount of black blemish is also small is used.

Further, the embodiment shown in FIGS. 1D, 2D, 3D, and 4D shows a method of calculating the mean value of the values excluding the maximum value in the case where the number of V-OB lines is equal to 3 or more. This embodiment is suitable for the CCD image pickup device in which although an amount of white blemish is large and the number of V-OB lines is also large, the amount of black blemish is small.

The embodiment shown in FIGS. 1E, 2E, 3E, and 4E shows a method whereby the mean value of the values excluding the maximum value and the minimum value is used as a represent-value in the case where the number of V-OB lines is equal to 4 or more. In addition to such an advantage that the signal is A/D converted into 22 bits and the dark current of the CCD image pickup device can be easily corrected, the embodiment of FIG. 1E is suitable for such an application that the CCD image pickup device in which the amount of white blemish and black blemish is large and the number of V-OB lines is also large is made operative at the high sensitivity.

According to the embodiment shown in FIGS. 1F, 2F, 3F, and 4F, the number of V-OB lines is equal to 4 or more and the mean value of the values excluding the maximum value and the second maximum value is used as a represent-value. This embodiment is suitable for such an application that the CCD image pickup device in which the amount of white blemish is particularly large and the number of V-OB lines is also large is made operative at the high sensitivity.

In the embodiments shown in FIGS. 1A to 1F, the smear corrector 5, represent-OB detector 6, and video processor 7 are separately provided. As another embodiment, the smear corrector 5, represent-OB detector 6, and video processor 7 can be also integrated in the memory integrated DSP only for use of a video image or the FPGA.

As for the V-OB, to avoid deterioration of the correcting precision that is caused by the vertical dark portion variation in which a fluctuation of the start of the scanning of the display screen is large, if the vertical dark portion variation of the image signals which are outputted from the V-OB area pixels in the lower portion of the display screen and are outputted after the effective pixels is corrected and, thereafter, the represent-value is calculated, the smear correcting precision is further improved. However, since the smear correction timing is delayed by the time corresponding to one display screen (about 17 millisecond (1/60 second)), such a method is not practical. Therefore, the signal is A/D converted into 14 bits, the vertical dark portion variation in which the fluctuation of the start of the scanning of the display screen is large is corrected at high precision. If the vertical dark portion variation of the image signal which is outputted from the V-OB area pixels in the upper portion of the display screen and is outputted before the effective pixels is corrected and, thereafter, the represent-value is calculated, the smear correction can be made simultaneously with the output of the effective pixels and there is no delay.

Although the image pickup device using the EM-CCD and the CCD image pickup device of the HDTV in which the number of V-OB lines is small and the amount of black blemish is also small has been described in detail above, the invention is not limited to the image pickup devices disclosed here. Naturally, the invention can be also widely applied to other image pickup devices using CCDs other than those mentioned above.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

The invention claimed is:

1. An image pickup method for a solid-state image pickup device having an image pickup charge coupled device, a first obtaining unit for obtaining image signals which are outputted from effective pixels of a photosensitive surface of said e image pickup charge coupled device, and a second obtaining unit for obtaining signals which are outputted from light-shielded pixels in an upper portion or a lower portion of the photosensitive surface of said image pickup charge coupled device, comprising the steps of:

calculating at least one of represent-value signals which are calculated from (i) a mean value of a plurality of vertical pixel signals, which exclude signals having a first maximum value to (M−1)th maximum value, of the obtained signals which are outputted from the light-shielded pixels and obtained by said second obtaining unit, (ii) a mean value of a plurality of vertical signals, which exclude signals having a first maximum value to (M−1)th maximum value and signals having a first minimum value to (N−1)the minimum value, of the obtained signals, and (iii) a M-th maximum value of the obtained signals, wherein M is a natural number and equal to or larger than 3 and N is a natural number and equal to or larger than 2; and generating a vertical smear correction signal by subtracting said represent-value signal from the image signals which are outputted from the effective pixels and obtained by said first obtaining unit.

2. The method for the solid-state image pickup device having the image pickup charge coupled device according to claim 1, wherein said solid-state image pickup device further has a vertical dark portion variation correcting unit of the image signal, and said represent-value signal is calculated after a vertical dark portion variation of the signals outputted from said light-shielded pixels in the upper portion or the lower portion of the photosensitive surface of said image pickup charge coupled device was corrected.

3. The method according to claim 1, wherein the number of vertical lines of the larger number of pixels of either the light-shielded pixels in the upper portion or the light-shielded pixels in the lower portion of the photosensitive surface of said image pickup charge coupled device is equal to one of 2, 3, and 4.

4. The method according to claim 1, wherein the signals outputted from said image pickup charge coupled device are A/D converted into 12 bits or more, said represent-value signal is calculated, and said represent-value signal is attenuated into the signal of a ratio within a range from 3/4 or more to less than 1 and subtracted from the image signals outputted from the effective pixels of the photosensitive surface of said image pickup charge coupled device.

5. A method according to claim 4, wherein the signals outputted from said image pickup charge coupled device are A/D converted into 14 bits, said represent-value signal is calculated, and said represent-value signal is attenuated into 15/16 and subtracted from the image signals outputted from the effective pixels of the photosensitive surface of said image pickup charge coupled device.

6. The method according to claim 1, wherein the number of vertical lines of the larger number of pixels of either the light-shielded pixels in the upper portion or the light-shielded pixels in the lower portion of the photosensitive surface of said image pickup charge coupled device is equal to a plural number.

7. The method according to claim 1, wherein the signals outputted from said image pickup charge coupled device are A/D converted at resolution which is higher by p bits or more than the number of bits of the signal which is outputted from the image pickup charge coupled device, said represent-value signal is calculated, and said represent-value signal is attenuated into the signal of a ratio within a range from $(2^p-s)/(2^p)$ or more to less than 1 (where, p and s are natural numbers and s<p) and subtracted from the image signals outputted from the effective pixels of the photosensitive surface of said image pickup charge coupled device.

8. The method according to claim 7, wherein s=1.

9. The method according to claim 1, wherein the signals outputted from said image pickup charge coupled device are A/D converted using redundant q bits (q is a natural number), said represent-value signal is attenuated into the signal of a ratio within a range where said represent-value signal can be linearly processed and is subtracted from the image signals outputted from the effective pixels of the photosensitive surface of said image pickup charge coupled device.

10. An image pickup device comprising:
an image pickup charge coupled device;
a first obtaining unit for obtaining image signals which are outputted from effective pixels of a photosensitive surface of said image pickup charge coupled device; and
a second obtaining unit for obtaining signals which are outputted from light-shielded pixels in an upper portion or a lower portion of said photosensitive surface of said image pickup charge coupled device,
wherein a vertical smear correction signal is generated based on at least one of represent-value signals which are calculated from (i) a mean value of a plurality of vertical pixel signals, which exclude signals having a first maximum value to (M−1)th maximum value, of the obtained signals which are outputted from the light-shielded pixels and obtained by said second obtaining unit, (ii) a mean value of a plurality of vertical signals, which exclude signals having a first maximum value to (M−1)th maximum value and signals having a first minimum value to (N−1)th minimum value of the obtained signals wherein M is a natural number and equal to or larger than 3 and N is a natural number and equal to or larger than 2.

11. The device according to claim 10, further comprising:
a comparator for comparing the values of said vertical pixel signals which are predetermined reference value; and
a memory unit for storing values based on comparison results of said comparator,
wherein said represent-value signal is calculated based on the values stored in the memory unit.

12. The device according to claim 11, further comprising:
an adding unit for adding the values stored in said memory unit and based on said comparison results; and
an averaging unit for calculating a mean value from the sum of the values added by said adding unit,
wherein said represent-value signal is calculated based on said mean value.

* * * * *